United States Patent
Yamanaka et al.

(10) Patent No.: US 10,663,076 B2
(45) Date of Patent: *May 26, 2020

(54) ELECTRIC ACTUATOR AND METHOD OF MANUFACTURING THE SAME

(71) Applicant: DENSO CORPORATION, Kariya, Aichi-pref. (JP)

(72) Inventors: Tetsuji Yamanaka, Kariya (JP); Naoaki Kouno, Kariya (JP); Etsugo Yanagida, Kariya (JP); Hiroki Shimada, Kariya (JP)

(73) Assignee: DENSO CORPORATION, Kariya (JP)

( * ) Notice: Subject to any disclaimer, the term of this patent is extended or adjusted under 35 U.S.C. 154(b) by 249 days.

This patent is subject to a terminal disclaimer.

(21) Appl. No.: 15/736,812

(22) PCT Filed: Jun. 7, 2016

(86) PCT No.: PCT/JP2016/002751
§ 371 (c)(1),
(2) Date: Dec. 15, 2017

(87) PCT Pub. No.: WO2016/203736
PCT Pub. Date: Dec. 22, 2016

(65) Prior Publication Data
US 2018/0259088 A1   Sep. 13, 2018

(30) Foreign Application Priority Data

Jun. 18, 2015  (JP) .................................. 2015-123013
May 23, 2016  (JP) .................................. 2016-102277

(51) Int. Cl.
*F16K 31/04* (2006.01)
*F16K 31/53* (2006.01)
(Continued)

(52) U.S. Cl.
CPC ............ *F16K 31/047* (2013.01); *F01D 17/10* (2013.01); *F01D 17/16* (2013.01); *F02B 37/186* (2013.01);
(Continued)

(58) Field of Classification Search
CPC ...... F02B 37/18; F02B 37/183; F02B 37/186; F16K 31/047; F16K 31/535; F16H 1/06; F01D 17/16
(Continued)

(56) References Cited

U.S. PATENT DOCUMENTS 3,921,264 A * 11/1975 Madonian ............. F16K 31/047
                                                      475/154
6,105,743 A *  8/2000 Salecker ................. F16H 45/02
                                                      192/84.6
(Continued)

FOREIGN PATENT DOCUMENTS

JP    2002-349641        12/2002
JP    2013234703 A  *  11/2013
(Continued)

OTHER PUBLICATIONS

International Search Report for PCT/JP2016/002751, dated Jul. 19, 2016, 4 pages.

*Primary Examiner* — Thai Ba Trieu
(74) *Attorney, Agent, or Firm* — Nixon & Vanderhye P.C.

(57) ABSTRACT

A rotation stop shape is visually recognizable through an exposing hole. A relative angle between an output shaft and an actuator lever can be freely set while the rotation stop shape, which is visually recognizable through the exposing hole, is used as the reference angle of the output shaft. Therefore, it is possible to limit disadvantageous variations in a fixation angle of the actuator lever. The fixation angle of the actuator lever relative to the output shaft can be freely (Continued)

changed by using the rotation stop shape, which is visually recognizable through the exposing hole, as a reference angle of the output shaft.

5 Claims, 9 Drawing Sheets

(51) Int. Cl.
    *H02K 7/116*     (2006.01)
    *F01D 17/10*     (2006.01)
    *F01D 17/16*     (2006.01)
    *F02B 37/18*     (2006.01)
    *F16H 1/06*     (2006.01)

(52) U.S. Cl.
    CPC ................ *H02K 7/116* (2013.01); *F16H 1/06* (2013.01); *F16K 31/535* (2013.01); *Y02T 10/144* (2013.01)

(58) Field of Classification Search
    USPC ............ 60/602; 251/205; 415/150; 407/408; 74/335; 475/154
    See application file for complete search history.

(56) References Cited

U.S. PATENT DOCUMENTS

| | | | | |
|---|---|---|---|---|
| 6,155,126 A * | 12/2000 | Vogt | ........................ | F16H 59/70 74/335 |
| 6,244,565 B1 * | 6/2001 | McDonnell | ............. | F02D 11/10 251/305 |
| 6,435,169 B1 * | 8/2002 | Vogt | ...................... | F02B 37/186 60/602 |
| 7,247,004 B2 * | 7/2007 | Suganami | ............. | F02B 37/186 417/408 |
| 8,074,622 B2 * | 12/2011 | Telep | .................... | F02B 37/186 123/399 |
| 8,978,379 B2 * | 3/2015 | Gotoh | ................... | F02B 37/186 60/602 |
| 9,976,475 B2 * | 5/2018 | Nowak | ................ | F02B 37/186 |
| 2002/0184760 A1 * | 12/2002 | Babin | ...................... | H02K 5/00 29/888 |
| 2003/0024338 A1 * | 2/2003 | Roither | .................... | H02K 7/06 74/425 |
| 2003/0185672 A1 * | 10/2003 | Suganami | ............. | F02B 37/186 415/150 |
| 2003/0201742 A1 * | 10/2003 | Pringle | .................... | G05G 5/05 318/466 |
| 2004/0187495 A1 * | 9/2004 | Ando | ...................... | F01D 17/16 60/602 |
| 2005/0109315 A1 * | 5/2005 | Kamimura | ............ | F02D 9/1065 123/399 |
| 2006/0000443 A1 * | 1/2006 | Kado | ...................... | F02D 11/10 251/305 |
| 2007/0084439 A1 * | 4/2007 | Isogai | ................... | F16K 31/043 251/205 |
| 2012/0124993 A1 * | 5/2012 | Kim | ...................... | F02B 37/186 60/602 |
| 2013/0291539 A1 * | 11/2013 | Koch | .................... | F02B 37/186 60/602 |
| 2015/0308583 A1 * | 10/2015 | Suzuki | ................. | F16K 31/043 74/665 A |
| 2018/0172120 A1 * | 6/2018 | Kouno | .................. | F02B 37/186 |
| 2018/0187791 A1 * | 7/2018 | Yamanaka | ............ | F16K 31/047 |
| 2018/0191221 A1 * | 7/2018 | Kouno | ..................... | F16H 1/06 |

FOREIGN PATENT DOCUMENTS

| | | |
|---|---|---|
| WO | WO 2016/203733 | 12/2016 |
| WO | WO 2016/203734 | 12/2016 |
| WO | WO 2016/203735 | 12/2016 |

\* cited by examiner

ELECTRIC ACTUATOR AND METHOD OF MANUFACTURING THE SAME

CROSS REFERENCE TO RELATED APPLICATION

This application is the U.S. national phase of International Application No. PCT/JP2016/002751 filed Jun. 7, 2016, which designated the U.S. and claims priority to Japanese Patent Application No. 2015-123013 filed on Jun. 18, 2015 and Japanese Patent Application No. 2016-102277 filed on May 23, 2016, the entire contents of each of which are hereby incorporated by reference.

TECHNICAL FIELD

The present disclosure relates to an electric actuator for a turbocharger and a manufacturing method for the same.

BACKGROUND ART

As one example of an electric actuator for a turbocharger, a technique recited in the patent literature 1 is known.

The patent literature 1 discloses a technique of conducting an output of an electric actuator to a valve of a turbocharger through a so-called four-bar linkage.

The four-bar linkage includes: an actuator lever, which is fixed to an output shaft of the electric actuator; a valve lever, which is fixed to a valve shaft that is rotated integrally with the valve; and a rod, which conducts a rotational torque of the actuator lever to the valve lever.

According to the technique of the patent literature 1, the actuator lever is disadvantageously freely rotated relative to the output shaft at a stage before fixing of the actuator lever to the output shaft. Specifically, there is a disadvantage of that a fixation angle of the actuator lever relative to the output shaft cannot be determined.

In the state where the fixation angle of the actuator lever is not determined, when the actuator lever is fixed to the output shaft, variations in the rotational range of the actuator lever will occur. Thereby, variations in a link ratio of the four-bar linkage will occur. Thus, operability of the valve provided at the turbocharger will be deteriorated.

It is conceivable that the fixation angle of the actuator lever relative to the output shaft is determined by using a key groove or a width across flats, in order to avoid the above disadvantage.

In such a case, an installation angle of the electric actuator relative to the turbocharger and a positional relationship of a valve shaft provided to the turbocharger are determined.

Therefore, versatility of the electric actuator is deteriorated. That is, in a case where the installation angle of the electric actuator relative to the turbocharger is changed, it is required to change the design of the electric actuator. Similarly, in a case where the position of the valve shaft is changed, it is required to change the design of the electric actuator.

CITATION LIST

PATENT LITERATURE: JP2002-349641A

SUMMARY OF INVENTION

The present disclosure is made in view of the above disadvantage, and it is an objective of the present disclosure to provide an electric actuator, which has good versatility and can limit variations in a fixation angle of an actuator lever relative to an output shaft, and a manufacturing method of the same.

In order to achieve the above objective, according to the present disclosure, there is provided an electric actuator that includes a housing, an electric motor, a speed reducing gear device of a parallel shaft type, an output shaft, a cover and an actuator lever. The housing has an opening portion, which opens in one direction. The electric motor is installed in the housing. The speed reducing gear device is installed in the housing and reduces a rotational speed of a rotational force generated by the electric motor. The output shaft is installed in the housing and is driven by the rotational force, the rotational speed of which is reduced by the speed reducing gear device. The cover is installed to the housing. The cover forms a space between the cover and the housing to receive the electric motor and the speed reducing gear device in the space, and one end part of the output shaft is exposed from the cover to an outside of the cover. The actuator lever is fixed to the one end part of the output shaft, which is exposed to the outside of the cover. The actuator lever drives a valve installed in a turbocharger. A cylindrical tubular portion, which has an outer diameter reduced through an annular step surface, is formed at the one end part of the output shaft. A circular hole, into which the cylindrical tubular portion is inserted, is formed in the actuator lever. The housing has an exposing hole, through which another end part of the output shaft is exposed to the outside. A rotation stop shape, which is engageable with a tool that limits rotation of the output shaft, is formed at the another end part of the output shaft. The rotation stop shape is visually recognizable through the exposing hole.

A relative angle between the output shaft and the actuator lever can be freely set by using the rotation stop shape, which is visually recognizable through the exposing hole, as a reference angle of the output shaft. Therefore, it is possible to limit disadvantageous variations in the fixation angle of the actuator lever.

Furthermore, the rotation stop shape, which is visually recognizable through the exposing hole, is used as the reference angle of the output shaft, so that the fixation angle of the actuator lever relative to the output shaft can be freely changed. Therefore, the versatility of the electric actuator can be improved.

Therefore, by adapting the principle of the present disclosure, it is possible to provide the electric actuator, which has good versatility and can limit variations in the fixation angle of the actuator lever relative to the output shaft.

Furthermore, according to the present disclosure, there is provided a manufacturing method of the electric actuator. The electric actuator is manufactured through use of a jig, which supports the housing. The jig has a tool, which is engageable with the rotation stop shape. The manufacturing method of the electric actuator of the present disclosure includes a jig installing step of installing the housing to a predetermined location of the jig; an inside assembling step of assembling the electric motor, the speed reducing gear device and the output shaft into an inside of the opening portion; an engaging step of engaging the rotation stop shape to the tool and thereby positioning the output shaft in a rotational direction in the inside assembling step a cover assembling step of assembling the cover to the housing; a lever fitting step of fitting the cylindrical tubular portion into the circular hole; and a lever fixing step of determining a fixation angle of the actuator lever relative to the output shaft and fixing the actuator lever to the output shaft.

DESCRIPTION OF EMBODIMENTS

Hereinafter, an embodiment of the present disclosure will be described with reference to the drawings. The following embodiment merely discloses one example, and it should be understood that the present disclosure is not limited to the embodiment.

First Embodiment

The first embodiment will be described with reference to FIGS. 1 to 11.

Figure 1:
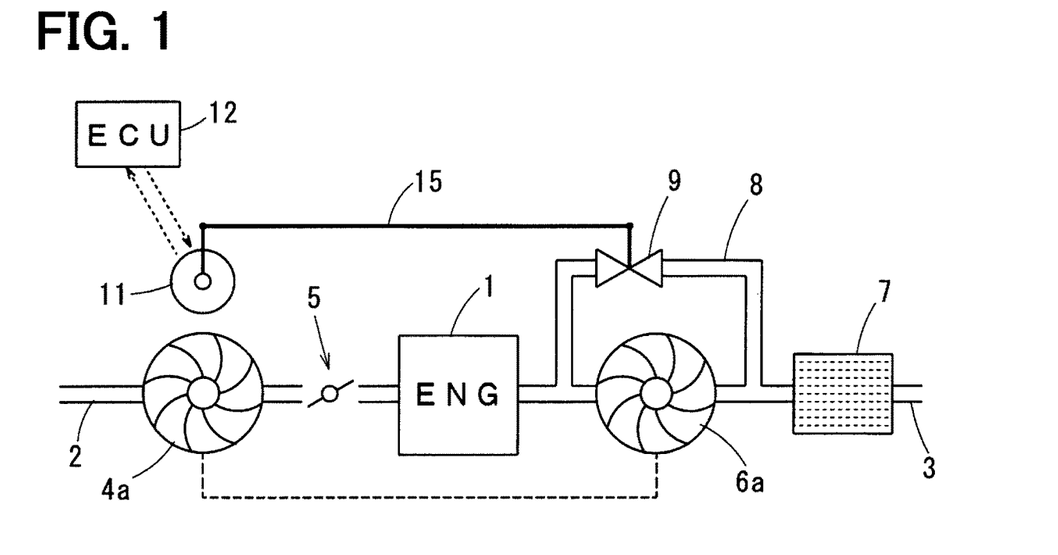
FIG. 1 is a schematic diagram of an engine intake and exhaust system according to an embodiment of the present disclosure.

An engine 1, which is installed in a vehicle and drives the vehicle, has an intake passage 2, which guides intake air to cylinders of the engine 1, and an exhaust passage 3, which discharges exhaust gas generated in the cylinders to the atmosphere.

An intake air compressor 4 of a turbocharger T and a throttle valve 5 for adjusting the amount of intake air supplied to the engine 1 are installed to the middle of the intake passage 2.

An exhaust gas turbine 6 of the turbocharger T and a catalyst 7 for purifying the exhaust gas are installed to the middle of the exhaust passage 3. The catalyst 7 is a known three-way catalyst having a monolithic structure. The catalyst 7 purifies noxious components contained in the exhaust gas through chemical oxidation and chemical reduction upon increasing of the temperature of the catalyst 7 to an activation temperature.

Figure 2:
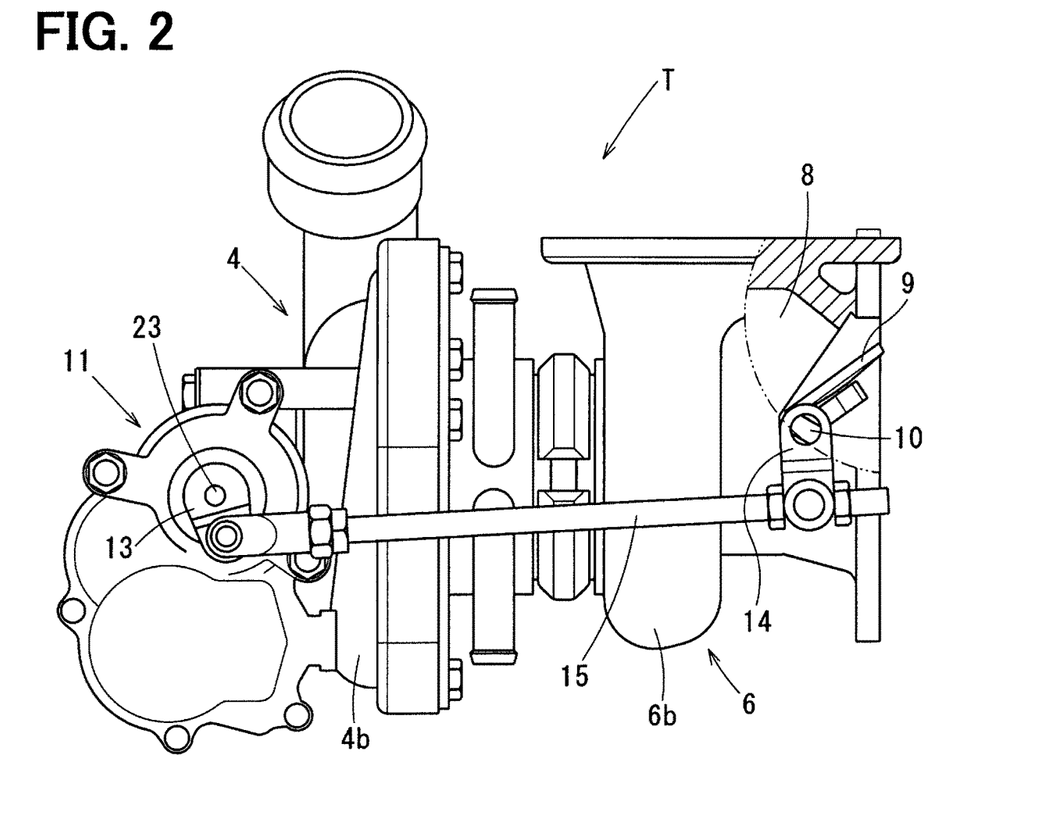
FIG. 2 is a descriptive view of a turbocharger according to the embodiment of the present disclosure.
Figure 3:
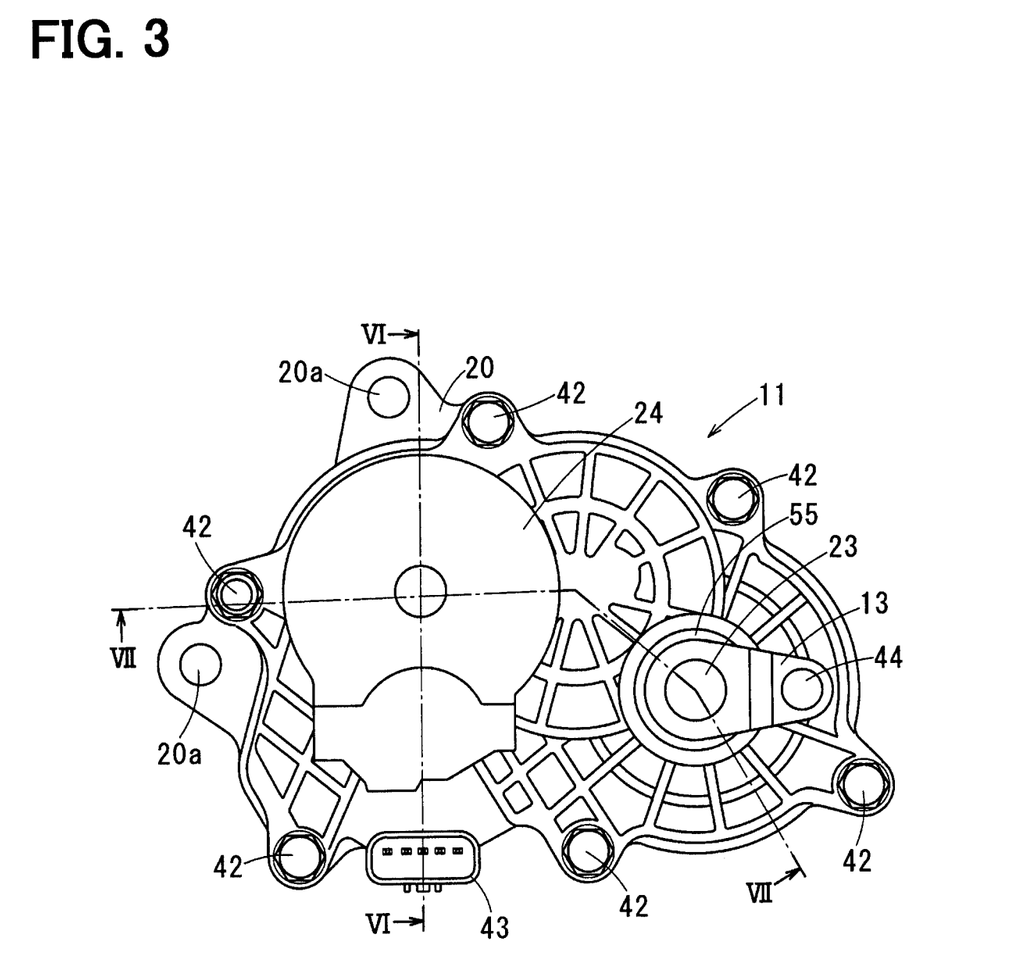
FIG. 3 is a top view of an electric actuator according to the embodiment of the present disclosure.
Figure 4:
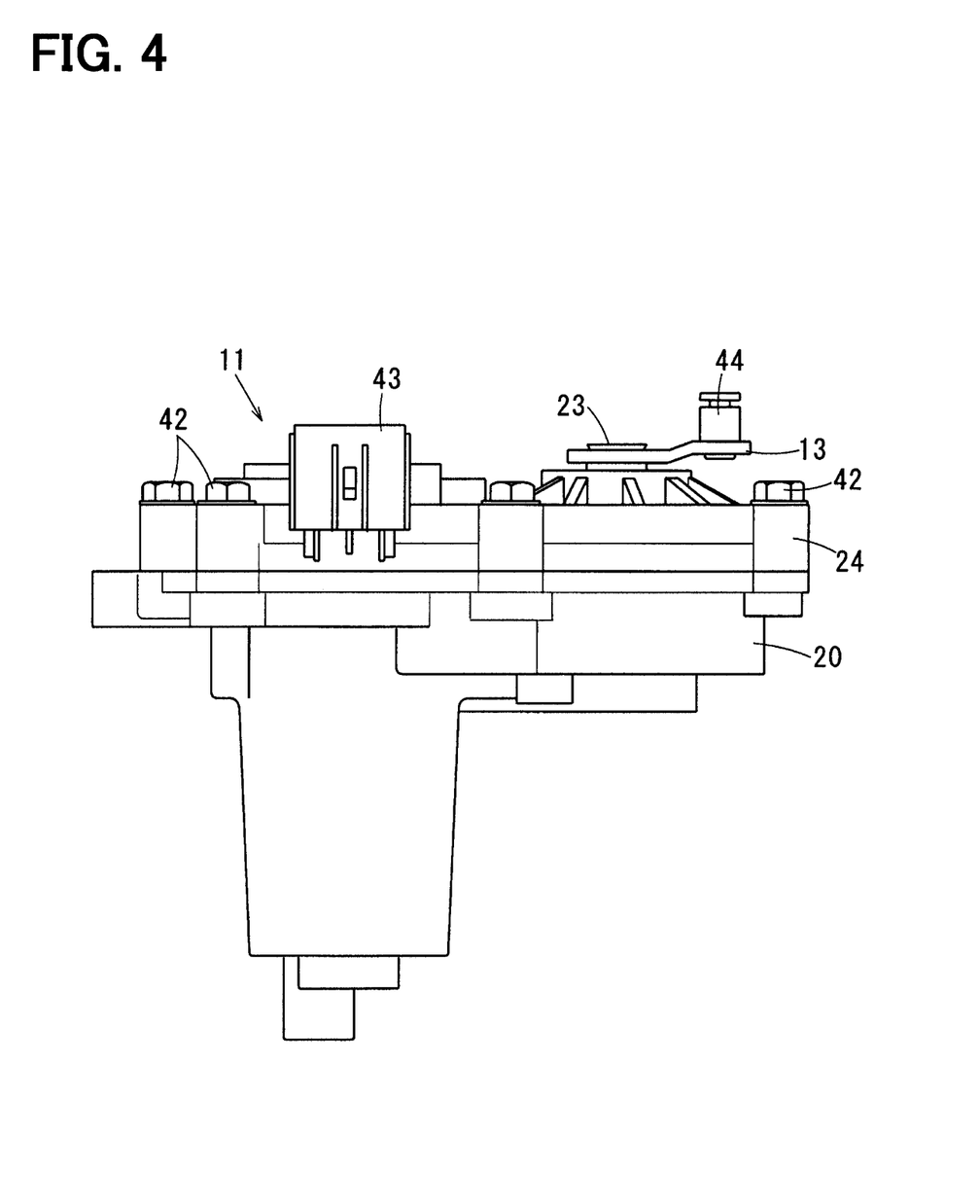
FIG. 4 is a side view of the electric actuator according to the embodiment of the present disclosure.

The exhaust gas turbine 6 includes: a turbine wheel 6a, which is rotated by the exhaust gas discharged from the engine 1; and a turbine housing 6b, which is shaped into a vortex form and receives the turbine wheel 6a.

The intake air compressor 4 includes: a compressor wheel 4a, which is rotated upon receiving a rotational force from the turbine wheel 6a; and a compressor housing 4b, which is shaped into a vortex form and receives the compressor wheel 4a.

A bypass passage 8, which conducts the exhaust gas while bypassing the turbine wheel 6a, is formed at the turbine housing 6b.

The bypass passage 8 directly guides the exhaust gas, which flows into the turbine housing 6b, to an exhaust gas outlet of the turbine housing 6b. This bypass passage 8 is configured to be openable and closable by a wastegate valve 9.

The wastegate valve 9 is a swing valve that is rotatably supported in an inside of the turbine housing 6b. Specifically, the wastegate valve 9 is rotated through a valve shaft 10 that is supported such that the valve shaft 10 is rotatable relative to the turbine housing 6b.

The wastegate valve 9 adjusts an opening degree of the bypass passage 8 to control a boost pressure generated by the turbocharger T at the time of operating the engine 1 at, for example, a high rotational speed.

Furthermore, the wastegate valve 9 fully opens the bypass passage 8 to warm up the catalyst 7 when the temperature of the catalyst 7 has not yet reached the activation temperature at the time of, for example, immediately after cold start of the engine 1. In this way, the high temperature exhaust gas, from which the heat is not taken by the turbine wheel 6a, can be guided to the catalyst 7, so that the rapid warm-up of the catalyst 7 can be executed.

The turbocharger T includes an electric actuator 11 as a means for rotating the wastegate valve 9. An ECU 12, which executes an engine control operation, controls energization of the electric actuator 11.

The electric actuator 11 is installed to the intake air compressor 4, which is remote from the exhaust gas turbine 6, for the purpose of avoiding an influence of the heat of the exhaust gas. As discussed above, the electric actuator 11 is installed at the location that is remote from the wastegate valve 9. Therefore, the turbocharger T has a link mechanism that conducts an output of the electric actuator 11 to the wastegate valve 9.

The link mechanism is a so-called four-bar linkage and includes: an actuator lever 13 that is rotated by the electric actuator 11; a valve lever 14 that is coupled to the valve shaft 10; and a rod 15 that conducts a rotational torque, which is applied to the actuator lever 13, to the valve lever 14.

Now, the electric actuator 11 will be described.

Figure 6:
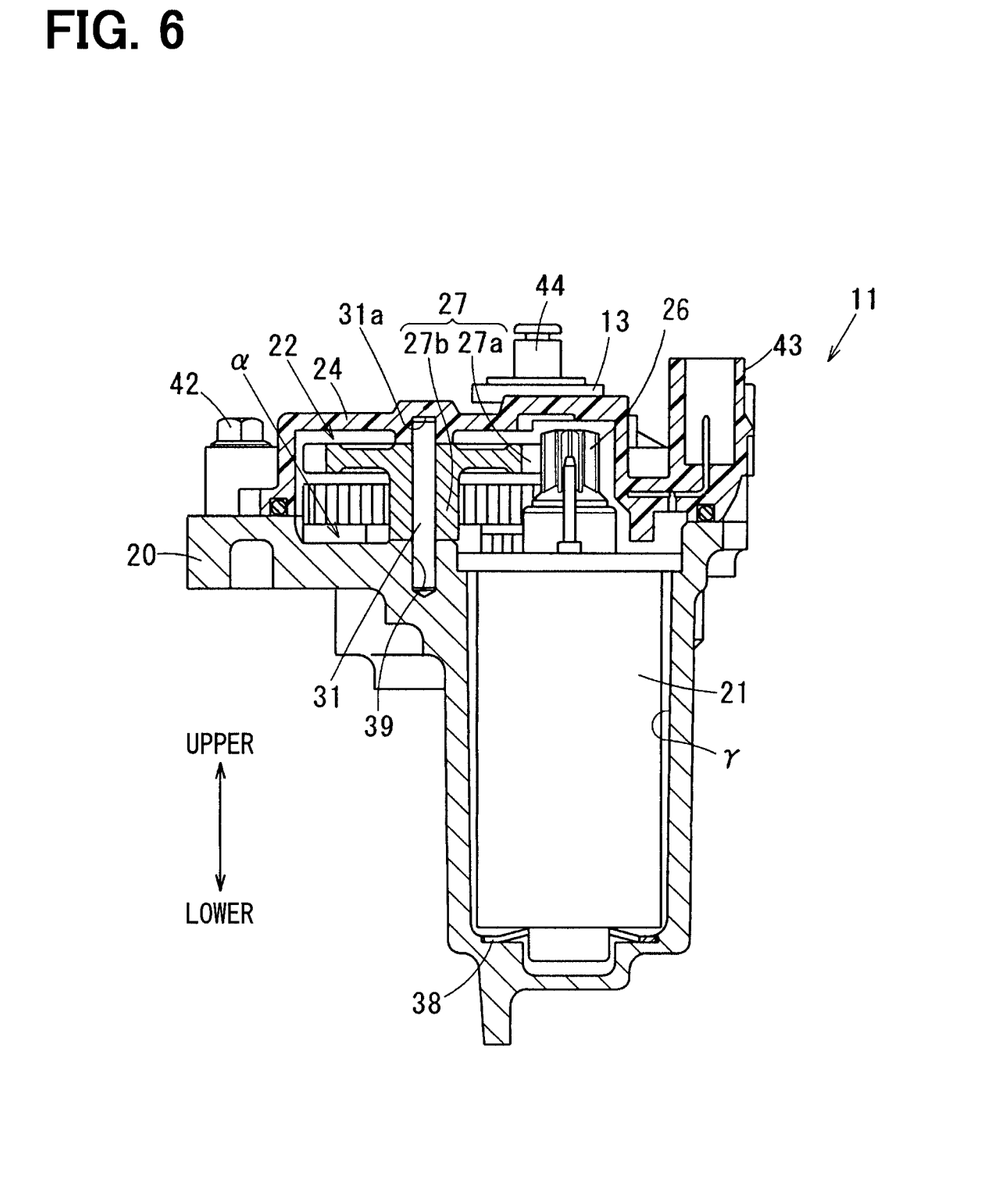
FIG. 6 is a cross-sectional view taken along line VI-VI in FIG. 3.
Figure 7:
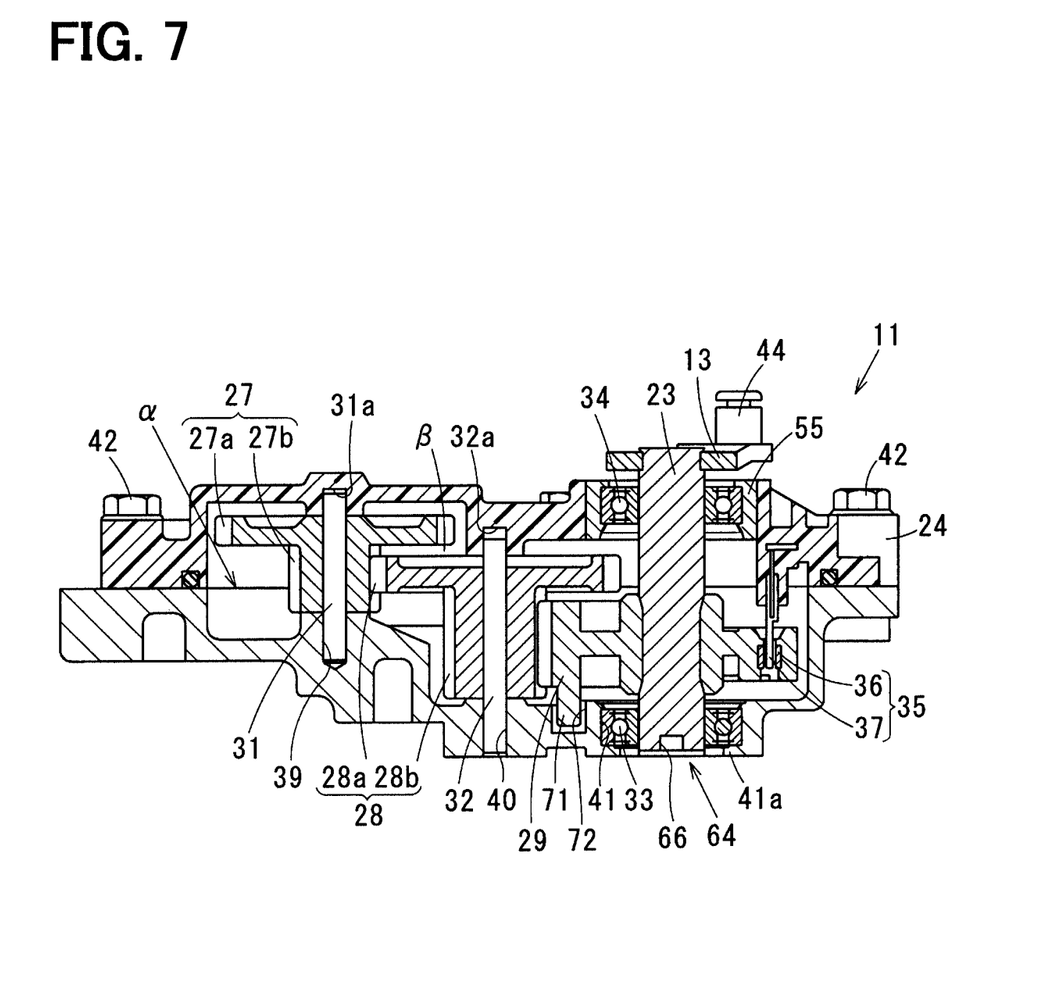
FIG. 7 is a cross-sectional view taken along line VII-VII in FIG. 3.

The electric actuator 11 includes: a housing 20 that is installed to the intake air compressor 4; an electric motor 21 that is installed in the housing 20; a speed reducing gear device 22; an output shaft 23; a cover 24; and an actuator lever 13 that is fixed to a upper end part of the output shaft 23. Here, the upper end part of the output shaft 23 serves as one end of the output shaft 23, and a lower end part of the output shaft 23 serves as another end part of the output shaft 23.

The housing 20 has an opening portion α that opens toward one side.

Hereinafter, for the descriptive purpose, a direction, in which the opening portion α opens, will be referred to as "upper", and an opposite direction will be referred to as "lower". This upper-to-lower direction should not limit an installation direction. Here, reference sign 20a shown in FIG. 3 indicates bolt insertion holes that are used at the time of assembling the electric actuator 11 to the intake air compressor 4.

The housing 20 is a die-cast product made of, for example, aluminum. The cover 24 is installed to an upper portion of the housing 20.

The electric motor 21 and the speed reducing gear device 22 are placed in a space β that is formed between the housing 20 and the cover 24.

The electric motor 21 is installed in the housing 20. Specifically, the electric motor 21 is inserted into a motor insertion chamber γ, which is formed in the housing 20, and thereafter the electric motor 21 is fixed to the housing 20 with, for example, screws. A structure of the electric motor 21 is not necessarily limited to any particular type. For example, the electric motor 21 may be a known direct current electric motor or a known stepping motor.

The speed reducing gear device 22 is installed in the housing 20. This speed reducing gear device 22 is a parallel shaft type that reduces a rotational speed of a rotational force generated by the electric motor 21.

Specifically, the speed reducing gear device 22 includes: a pinion gear 26 that is driven by the electric motor 21; a first intermediate gear 27 that is rotated by the pinion gear 26; a second intermediate gear 28 that is rotated by the first intermediate gear 27; and a final gear 29 that is rotated by the second intermediate gear 28.

The pinion gear 26 is an external gear that has a small diameter and is fixed to the rotatable shaft of the electric motor 21.

The first intermediate gear 27 is a double gear that includes a first large diameter gear 27a and a first small diameter gear 27b, which are coaxial. The first intermediate gear 27 is rotatably supported by a first intermediate shaft 31 that is fixed to the housing 20. The first large diameter gear 27a is always meshed with the pinion gear 26.

Similar to the first intermediate gear 27, the second intermediate gear 28 is a double gear that includes a second large diameter gear 28a and a second small diameter gear 28b, which are coaxial. The second intermediate gear 28 is rotatably supported by a second intermediate shaft 32 that is fixed to the housing 20. The second large diameter gear 28a is always meshed with the first small diameter gear 27b, and the second small diameter gear 28b is always meshed with the final gear 29.

The final gear 29 is an external gear that has a large diameter and is fixed to the output shaft 23. The final gear 29 is formed only in a predetermined rotational range.

The output shaft 23 is rotatably supported by a lower bearing 33, which is installed to the housing 20, and an upper bearing 34, which is installed to the cover 24.

The electric actuator 11 includes a rotational angle sensor 35. The rotational angle sensor 35 senses a rotational angle of the output shaft 23, and thereby the rotational angle sensor 35 senses an opening degree of the wastegate valve 9.

The rotational angle sensor 35 is a contactless type and is placed at a location that is offset from the central axis C of the output shaft 23.

Specifically, the rotational angle sensor 35 includes: the magnetic flux generating portion 36, which is rotated integrally with the output shaft 23; and the magnetic sensing device 37, which is installed to one of the cover 24 or the housing 20 and senses the magnetic flux generated from the magnetic flux generating portion 36. The magnetic flux generating portion 36 is placed in a rotational range, which is around the output shaft 23 and in which the final gear 29 does not exist.

In this embodiment, there is described the example where the magnetic sensing device 37 is installed to the cover 24.

The rotational angle of the output shaft 23, which is sensed with the rotational angle sensor 35, is outputted to the ECU 12.

The ECU 12 is an engine control unit having a microcomputer and includes a control program for controlling energization of the electric actuator 11.

Specifically, the ECU 12 computes a target opening degree of the wastegate valve 9 that is suitable for an operational state of the engine 1 based on the operational state of the engine 1. Then, the ECU 12 executes a feedback control operation of the electric actuator 11 such that the sensed opening degree, which is sensed through the rotational angle sensor 35, coincides with the computed target opening degree. This boost pressure control operation is only one example, and the present disclosure should not be limited to this boost pressure control operation.

Furthermore, the ECU 12 executes the rapid warm-up of the catalyst 7 when the actual temperature or the predicted temperature of the catalyst 7 has not yet reached the activation temperature at the time of, for example, immediately after the cold start of the engine. Specifically, at the time of executing the rapid warm-up of the catalyst 7, the ECU 12 sets the opening degree of the wastegate valve 9 to a predetermined opening degree. As a result, it is possible to limit the heat of the exhaust gas from being taken away by the wastegate valve 9. This rapid warm-up control operation of the catalyst 7 is only one example, and the present disclosure should not be limited to this rapid warm-up control operation of the catalyst 7.

(Characteristic Technique of First Embodiment)

A manufacturing method of the electric actuator 11 will now be described.

Figure 8:
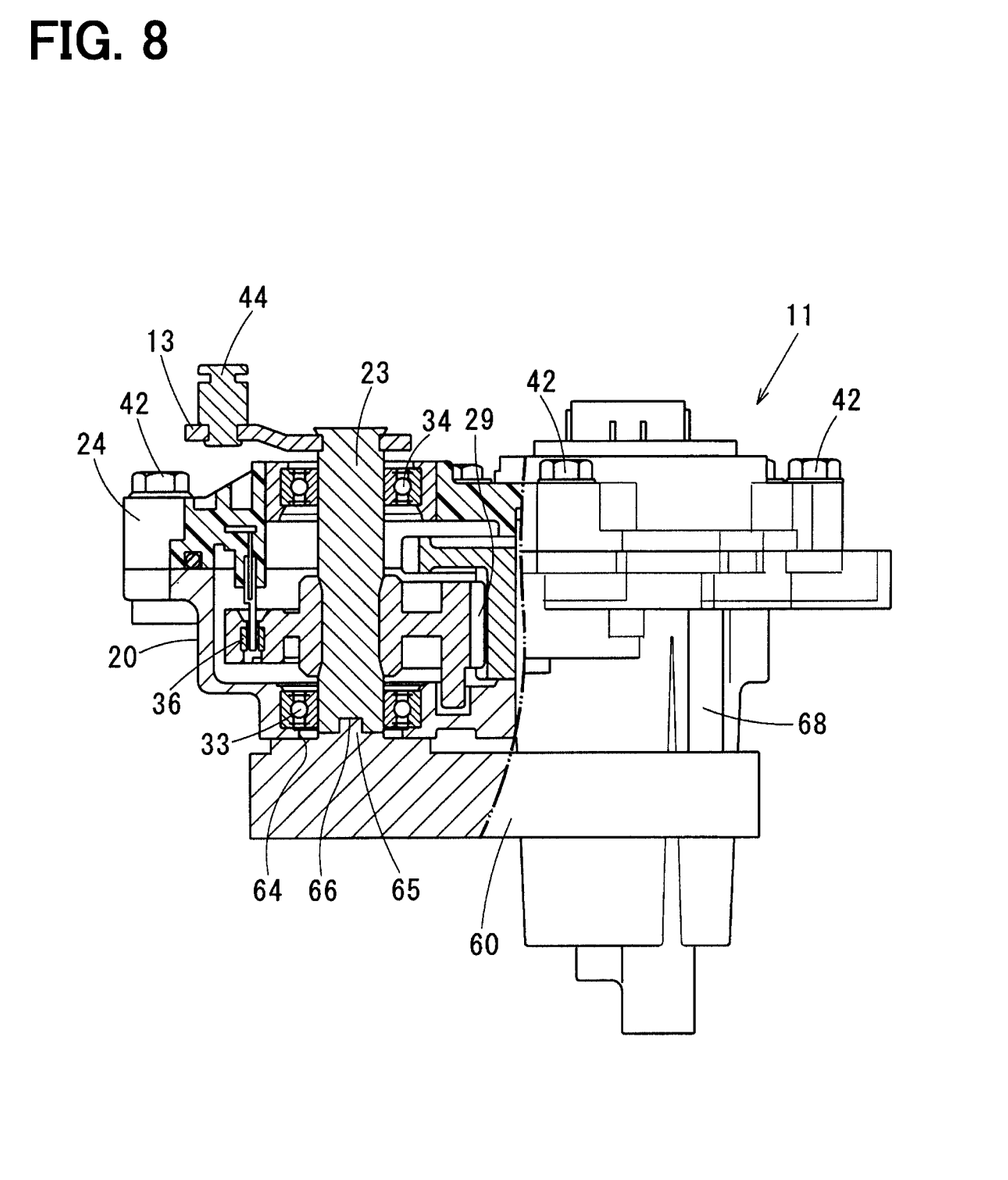
FIG. 8 is a cross-sectional view of a characteristic part of the electric actuator placed on a jig according to the embodiment of the present disclosure.
Figure 9:
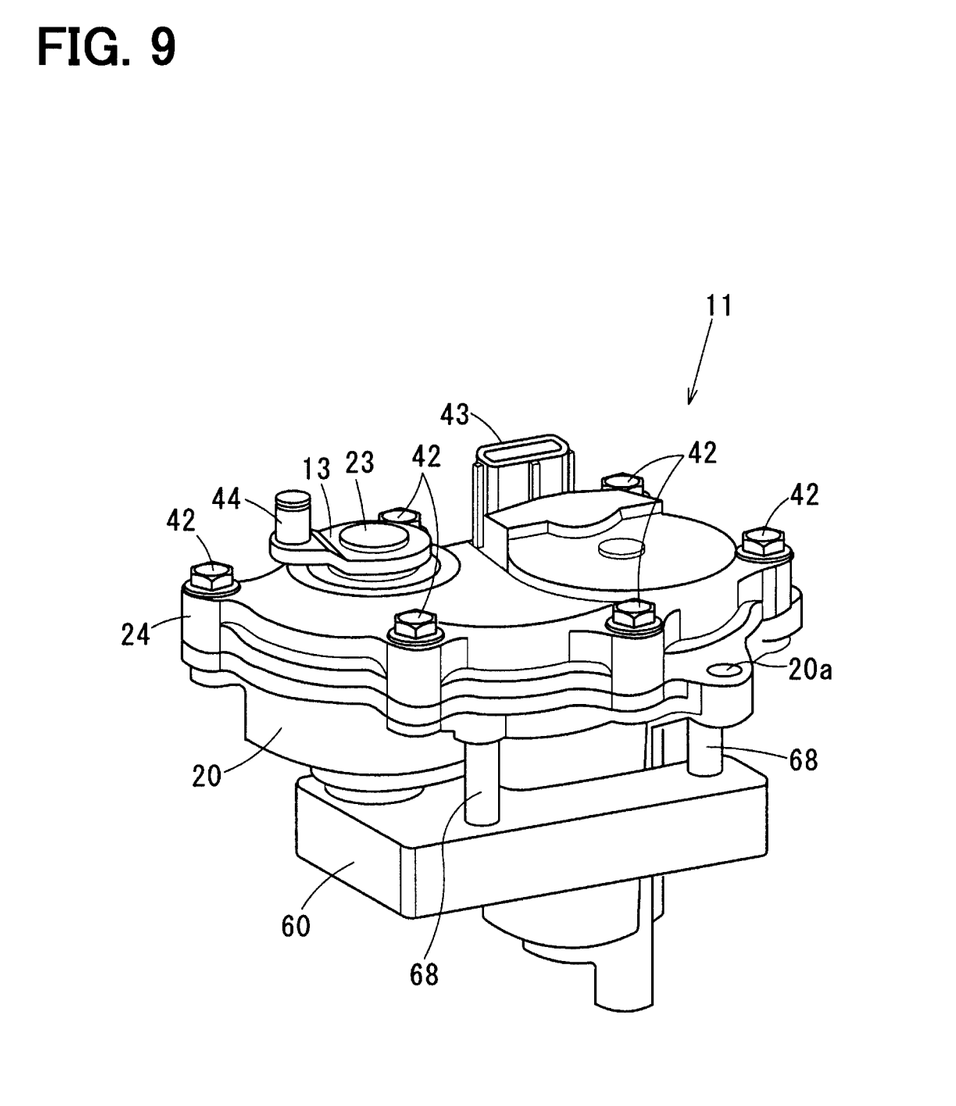
FIG. 9 is a perspective view of the electric actuator placed on the jig according to the embodiment of the present disclosure.

A jig 60, which is shown in FIGS. 8 and 9, is used at the time of assembling the electric actuator 11.

Figure 10:
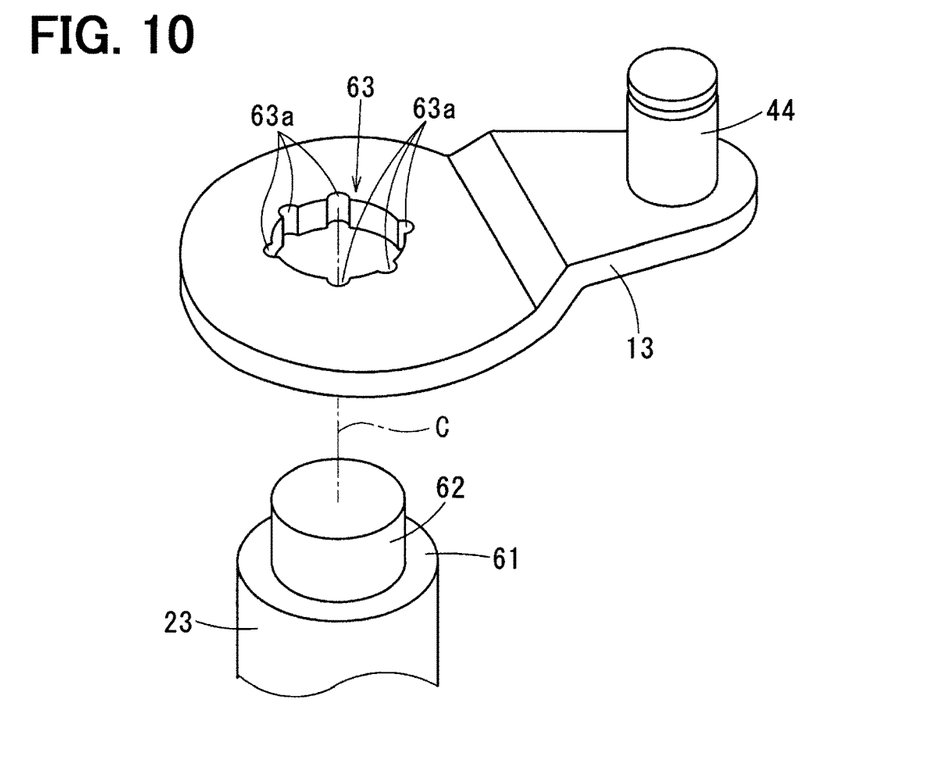
FIG. 10 is an exploded perspective view of an upper end part of output shaft and an actuator lever according to the embodiment of the present disclosure.

As shown in FIG. 10, a cylindrical tubular portion 62, which has an outer diameter reduced through an annular step surface 61, is formed at the upper end part of the output shaft 23. The step surface 61 is a planar surface that is shaped into a ring form and is perpendicular the axial direction of the output shaft 23. The cylindrical tubular portion 62 is coaxial with a rotational center of the output shaft 23.

As shown in FIG. 10, a circular hole 63, into which the cylindrical tubular portion 62 is inserted, is formed at the actuator lever 13. An inner diameter of the circular hole 63 is slightly larger than an inner diameter of the cylindrical tubular portion 62.

The housing 20 has an exposing hole 64, through which the lower end part of the output shaft 23 is exposed to the outside of the housing 20.

The exposing hole 64 of the present embodiment will be specifically described. A lower bearing hole 41, into which the lower bearing 33 is press-fitted, is formed at the housing 20. A lower flange 41a, which limits movement of the lower bearing 33 toward the lower side, is formed at a lower end part of the lower bearing hole 41. In this embodiment, an inside of the lower flange 41a serves as the exposing hole 64.

Figure 11:
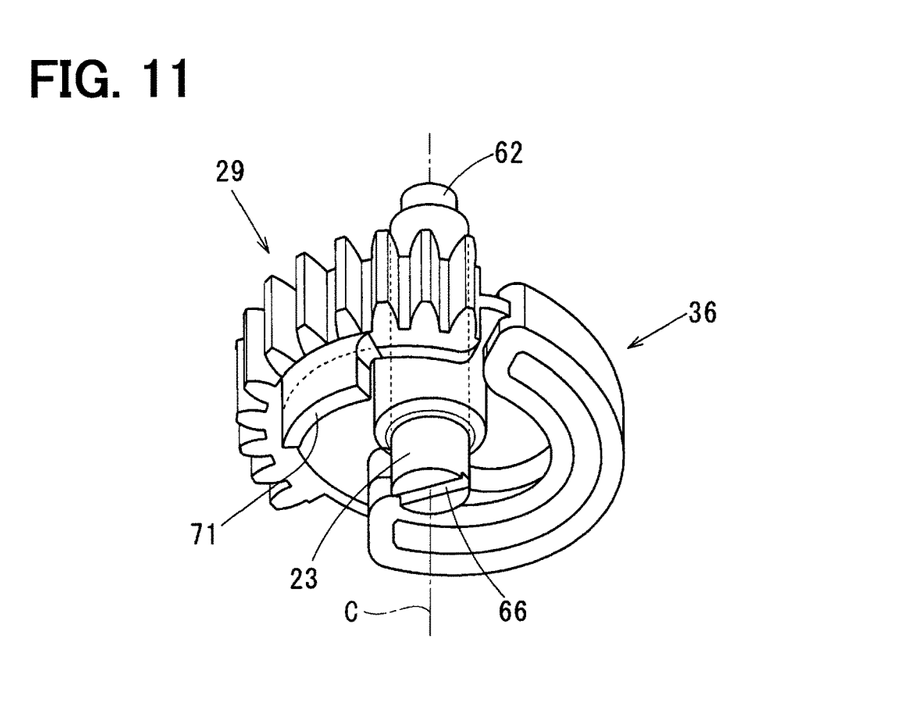
FIG. 11 is a perspective view taken from a lower side of the output shaft, at which a resin component forming a final gear is formed according to the embodiment of the present disclosure.

A rotation stop shape (also referred to as a rotation stop portion or a shaft side engaging portion) 66, which is engageable with a tool 65 that limits rotation of the output shaft 23, is formed at the lower end part of the output shaft 23.

Figure 5:
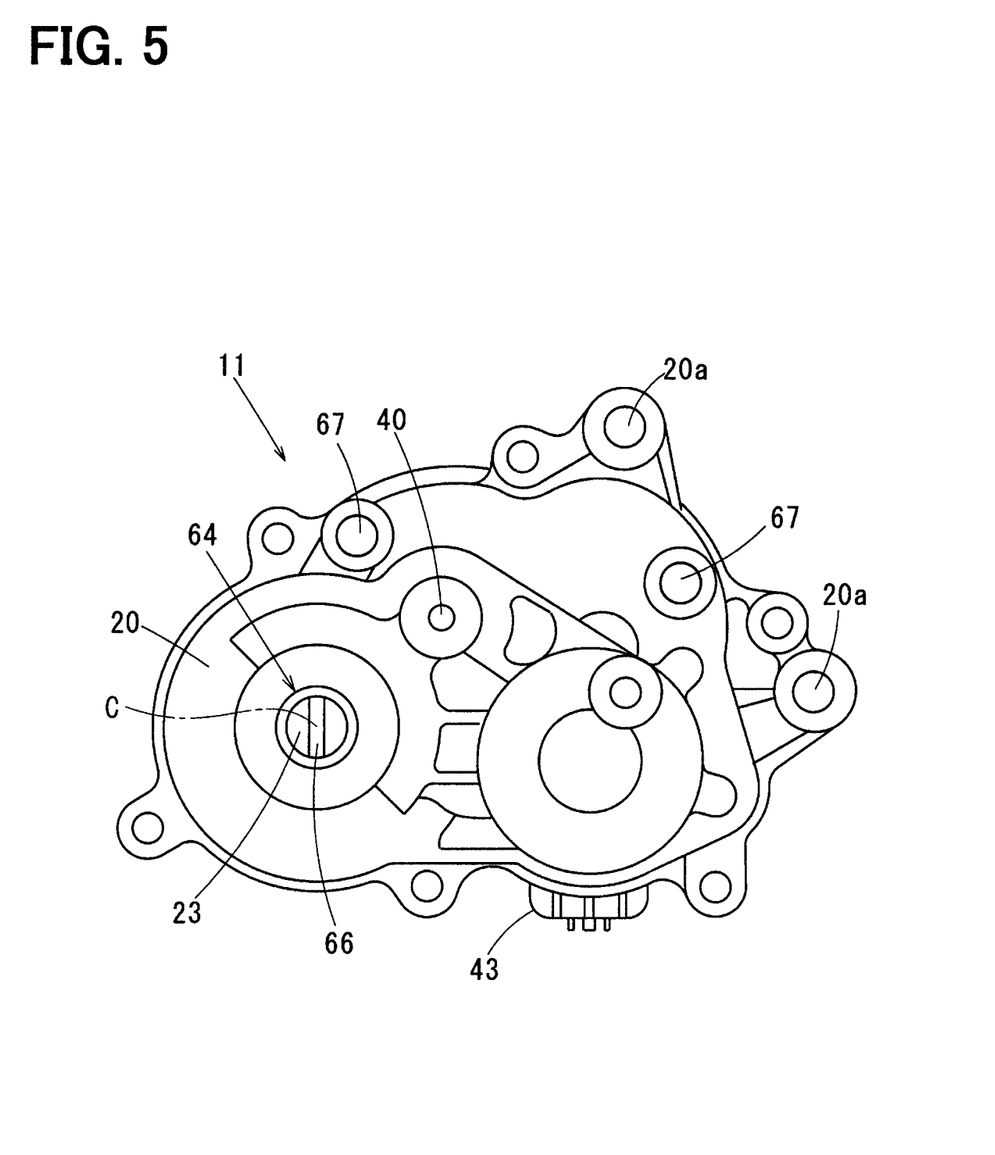
FIG. 5 is a bottom view of the electric actuator according to the embodiment of the present disclosure.

As shown in FIGS. 5 and 7, the rotation stop shape 66 is visually recognizable from the outside of the exposing hole 64. Specifically, the rotation stop shape 66, which is at the inside of the exposing hole 64, is visually recognizable from the outside of the housing 20. Specifically, as shown in FIG. 8, the exposing hole 64 is formed to enable insertion of the tool 65 from the outside of the housing 20 into the exposing hole 64 and engagement of the tool 65 with the rotation stop shape 66.

One specific example of the rotation stop shape 66 will now be described. As shown in FIG. 11, the rotation stop shape 66 of the present embodiment is in a form of a minus slot. Specifically, the rotation stop shape 66 of the present embodiment is formed by a linear slot that extends through the central axis C of the output shaft 23.

However, it should be understood that a specific shape of the rotation stop shape 66 is not necessarily limited to any particular one, and the rotation stop shape 66 can have any suitable shape as long as the rotation stop shape 66 can limit the rotation of the output shaft 23 upon fitting of the rotation stop shape 66 with the tool 65. Specifically, as an example, a plus slot may be used as the rotation stop shape 66, or a polygonal hole (e.g., a hexagonal hole) may be used as the rotation stop shape 66. Further alternatively, a star-shaped hole (e.g., a hexagram-shaped hole) may be used as the rotation stop shape 66, or an ellipse-shaped hole may be used as the rotation stop shape 66.

The tool 65 limits the rotation of the output shaft 23 upon fitting of the tool 65 to the rotation stop shape 66, and thereby the tool 65 positions the output shaft 23 in the rotational direction.

A specific shape of a portion of the tool 65, which is fitted to the rotation stop shape 66, is a linear projection shape. Here, it should be noted that in a case where the rotation stop shape 66 is changed to another shape, the shape of the portion of the tool 65, which is fitted to the rotation stop shape 66, is changed to coincide with the changed rotation stop shape 66. As a specific example, in the case where the rotation stop shape 66 is changed to the hexagonal hole, the shape of the tool 65 is also changed to a shape of a hexagonal wrench.

The jig 60 is provided to support the housing 20 at the time of manufacturing the electric actuator 11 and includes the tool (also referred to as a jig side engaging portion) 65 described above. Specifically, in the present embodiment, the tool 65 is formed integrally with the jig 60 in one piece. That is, a portion of the jig 60 is formed as the tool 65.

Here, it should be noted that the tool 65 may be provided separately from the jig 60 unlike the present embodiment. In such a case, it is desirable that the rotation angle of the tool 65 relative to the jig 60 can be set at an arbitrary angle.

Next, a specific manufacturing method of the electric actuator 11 will be described.

As discussed above, the opening portion α, which opens toward the upper side, is formed at the housing 20. Besides the motor insertion chamber γ, an installation space for installing the speed reducing gear device 22 and the output shaft 23 therein is provided in the inside of the opening portion α. All of the components, which are directly installed to the housing 20 and include the electric motor 21, the speed reducing gear device 22, the output shaft 23 and the cover 24, are installed to the housing 20 from the upper side toward the lower side.

At the time of assembling the electric actuator 11, a jig installing step, an inside assembling step, a cover assembling step, a lever fitting step and a lever fixing step are executed.

At the jig installing step, the housing 20 is installed to a predetermined location of the jig 60. Specifically, the housing 20 is placed on the jig 60 such that the opening portion α faces the upper side. At this time, the housing 20 is positioned relative to the jig 60.

This point will be specifically described. The housing 20 includes a plurality of positioning recesses 67. Specifically, as shown in FIG. 5, two positioning recesses 67 are formed at the lower surface of the housing 20.

The jig 60 includes a plurality of positioning pins 68, which are fitted into the positioning recesses 67, respectively. Specifically, two positioning pins 68, which project toward the upper side and are respectively fitted into the positioning recesses 67, are formed at the upper surface of the jig 60.

At the jig installing step, at the time of placing the housing 20 on the jig 60, the positioning pins 68 are fitted into the positioning recesses 67, respectively. Thereby, the housing 20 is assembled to the predetermined location relative to the jig 60, and the tool 65 is inserted into a center part of the exposing hole 64.

Next, the inside assembling step is executed.

The inside assembling step is a step of installing the electric motor 21, the speed reducing gear device 22 and the output shaft 23 into the inside of the opening portion α.

Details of the inside assembling step will now be described.

A wave washer 38 is installed from the upper side to a bottom of the motor insertion chamber γ. The wave washer 38 is compressed between the bottom of the motor insertion chamber γ and the electric motor 21 to limit the vibration of the electric motor 21.

Next, the electric motor 21 is inserted from the upper side into the motor insertion chamber γ.

Next, the electric motor 21 is fixed to the housing 20 by threadably engaging, for example, a plurality of screws to the housing 20 from the upper side of the housing 20.

The first intermediate shaft 31 and the second intermediate shaft 32 are press-fitted from the upper side into the housing 20. Specifically, a first press-fitting hole 39, into which the first intermediate shaft 31 is press-fitted, and a second press-fitting hole 40, into which the second intermediate shaft 32 is press-fitted, are preformed at a bottom surface of the inside of the opening portion α.

The first intermediate shaft 31 is press-fitted into the first press-fitting hole 39, and the second intermediate shaft 32 is press-fitted into the second press-fitting hole 40.

The lower bearing 33 is press-fitted from the upper side into the housing 20. Specifically, the lower bearing 33 is press-fitted into the lower bearing hole 41.

The output shaft 23 is press-fitted from the upper side into an inside of the lower bearing 33. Specifically, the final gear 29 and the magnetic flux generating portion 36 are installed to the output shaft 23. Therefore, when the output shaft 23 is press-fitted into the inside of the lower bearing 33, the final gear 29 and the magnetic flux generating portion 36 are also assembled to the housing 20.

At this time, an engaging step is executed. Specifically, at the time of assembling the output shaft 23, the engaging step is executed.

The engaging step is a step of engaging the rotation stop shape 66 to the tool 65 to position the output shaft 23 in the rotational direction at the time of press-fitting the output shaft 23 into the lower bearing 33.

Specifically, in the state where the final gear 29 faces the second intermediate shaft 32, the output shaft 23 is press-fitted into the inside of the lower bearing 33, and the rotation stop shape 66 is engaged to the tool 65. In this way, the rotational direction of the output shaft 23 is set to coincide with a predetermined direction.

This point will be described more specifically.

The rotation stop shape 66 of the present embodiment is in the form of the minus slot, as discussed above. Therefore, the rotation stop shape 66 and the tool 65 are engaged with each other at 180 degree intervals. Thus, it is possible to limit erroneous assembling of that the output shaft 23 is assembled at a difference angle that is different from a predetermined assembling angle.

A structure, which limits the erroneous assembling, will now be described further in detail.

The final gear 29 of the present embodiment has a stopper 71, which is formed integrally with the final gear 29 in one piece and projects toward the lower side.

The stopper 71 is inserted into an arcuate groove 72 that is formed at a bottom surface of the opening portion α. When the stopper 71 contacts an end part of the arcuate groove 72, which forms an end of the arcuate groove 72 in the radial direction, a rotational range of the output shaft 23 is mechanically limited.

The stopper 71 can be inserted into the arcuate groove 72 in a state where the final gear 29 faces the second intermediate shaft 32. Therefore, even when the output shaft 23 is inserted at an erroneous angle, the stopper 71 interferes with the housing 20. Thereby, the erroneous assembling of the output shaft 23 can be limited.

Next, the second intermediate gear 28 is assembled to the second intermediate shaft 32. Then, the first intermediate gear 27 is assembled to the first intermediate shaft 31.

Thereby, the inside assembling step is completed.

Next, the cover assembling step is executed.

The cover assembling step is a step of assembling the cover 24 to the housing 20.

Specifically, the cover 24 is installed from the upper side to the housing 20. At this time, the output shaft 23 is press-fitted to an inside of the upper bearing 34 that is press-fitted into the cover 24. Specifically, the cover 24 is made of resin. As a means for press-fitting the upper bearing 34, a bearing holder 55, which is made of metal and is shaped into a tubular form, is insert-molded in the cover 24 made of the resin. Then, before this cover assembling step, the upper bearing 34 is press-fitted into the inside of the bearing holder 55.

Next, the cover 24 is fixed to the housing 20 by threadably engaging a plurality of bolts 42 from the upper side to the housing 20.

A connector 43, which makes electrical connections to the electric motor 21 and the magnetic sensing device 37, is formed at the cover 24. Also, the magnetic sensing device 37 is installed to the cover 24. Therefore, when the cover 24 is assembled to the housing 20, assembling of the connector 43 and the magnetic sensing device 37 is completed. A first fitting hole 31a, into which an upper end part of the first intermediate shaft 31 is fitted, and a second fitting hole 32a, into which an upper end part of the second intermediate shaft 32 is fitted, are formed at the lower surface of the cover 24.

Thereby, the cover assembling step is completed.

Next, the lever fitting step is executed.

The lever fitting step is a step of fitting the actuator lever 13 to the upper end part of the output shaft 23 from the upper side of the output shaft 23. Specifically, this is a step of fitting the cylindrical tubular portion 62 and the circular hole 63 together.

In a state where the lever fitting step is completed, the actuator lever 13 can be rotated relative to the output shaft 23 by 360 degrees. A pin 44, which is rotatably coupled to the rod 15 at the rotating end part of the actuator lever 13, is joined to the actuator lever 13 in advance through another step that is different from the lever fitting step.

Next, the lever fixing step is executed.

At the lever fixing step, a fixation angle of the actuator lever 13 relative to the output shaft 23 is first determined. Specifically, the actuator lever 13 is oriented in a predetermined direction relative to the jig 60 or the housing 20.

Next, in a state where the fixation angle of the actuator lever 13 relative to the output shaft 23 is maintained, the actuator lever 13 is fixed to the output shaft 23.

The output shaft 23 and the actuator lever 13 are fixed together by a swaging technique, which plastically deforms the upper end part of the output shaft 23, or a welding technique.

As a specific example, in the present embodiment, the actuator lever 13 is fixed to the output shaft 23 through use of the swaging technique. Specifically, in the present embodiment, the upper end part of the output shaft 23 is swaged to increase an outer diameter of an end part of the cylindrical tubular portion 62, so that the actuator lever 13 is securely clamped between the end part of the cylindrical tubular portion 62, which has the increased outer diameter formed by the swaging, and the step surface 61. In this way, the actuator lever 13 is fixed to the output shaft 23.

A plurality of longitudinal grooves 63a is locally formed at a peripheral edge part of the circular hole 63. When the above-described swaging is executed, a corresponding portion of the output shaft 23, which is plastically deformed, bits into each longitudinal groove 63a. In this way, the connecting force between the output shaft 23 and the actuator lever 13 in the rotational direction is increased.

Thereby, the assembling of the electric actuator 11 is completed.

(Advantages of First Embodiment)

In the electric actuator 11 of the present embodiment, a relative angle between the output shaft 23 and the actuator lever 13 can be freely set by using the rotation stop shape 66, which is visually recognizable through the exposing hole 64, as the reference angle of the output shaft 23. Therefore, it is possible to limit variations in the fixation angle of the actuator lever 13.

Furthermore, the rotation stop shape 66, which is visually recognizable through the exposing hole 64, is used as the reference angle of the output shaft 23, so that the fixation angle of the actuator lever 13 relative to the output shaft 23 can be freely changed. Therefore, the versatility of the electric actuator 11 can be improved.

According to the manufacturing method of the electric actuator 11, the rotation stop shape 66, which is formed at the output shaft 23, is engaged with the tool 65 to position of the output shaft 23 in the rotational direction. Thereafter, the fixation angle of the actuator lever 13 is determined, and the actuator lever 13 is fixed to the output shaft 23. Thus, it is possible to limit the variations in the fixation angle of the actuator lever 13 relative to the output shaft 23.

In this way, it is possible to limit the variations in the link ratio of the four-bar linkage, and thereby it is possible to limit the deterioration of the operability of the wastegate valve 9.

Furthermore, the fixation angle of the actuator lever 13 relative to the output shaft 23 can be freely changed. Therefore, the versatility of the electric actuator 11 can be improved.

Specifically, even in a different vehicle, in which an installation angle of the electric actuator 11 relative to the turbocharger T is different, it is possible to adapt the electric actuator 11 without changing any component of the electric actuator 11.

Similarly, even for the turbocharger T, in which the position of the valve shaft 10 differs, it is possible to adapt the electric actuator 11 without changing any component of the electric actuator 11.

The electric actuator 11 of the present embodiment has the high versatility, as discussed above, so that the electric actuator 11 can be installed to various types of vehicles without changing any component of the electric actuator 11.

In this way, the manufacturing costs of the electric actuator 11 can be limited, and thereby the costs of the forced induction devices, which include the turbocharger T installed to the vehicle, can be limited.

Other Embodiments

In the above embodiment, the electric actuator 11 for driving the wastegate valve 9 is exemplified. However, the drive subject of the electric actuator 11 is not necessarily limited to the wastegate valve 9.

One specific example is as follows. That is, the electric actuator 11 may drive a change valve that opens and closes a second exhaust gas scroll provided at the turbine housing 6b. It should be understood that the electric actuator 11 may be used to drive both of the wastegate valve 9 and the change valve.

Alternatively, the present disclosure may be applied to an electric actuator 11 that is used to operate a nozzle vane (one example of a valve) of the turbocharger T that uses a variable nozzle mechanism.

Further alternatively, the present disclosure may be applied to an electric actuator 11 that switches between two turbochargers T at a two-stage turbocharger that uses the two turbochargers T.

In the above embodiment, as the specific example of the speed reducing gear device 22, there is discussed the example, in which the first intermediate gear 27 and the second intermediate gear 28 are placed between the pinion gear 26 and the final gear 29. However, the present disclosure is not necessarily limited to this example.

In the case where the speed reducing gear device 22 of the parallel shaft type is used, a single intermediate gear or three or more intermediate gears may be placed between the pinion gear 26 and the final gear 29.

The invention claimed is:

1. An electric actuator comprising:
   a housing that has an opening portion, which opens in one direction;
   an electric motor that is installed in the housing;
   speed reduction gears of a parallel shaft type that is installed in the housing for reducing a rotational speed of a rotational force generated by the electric motor;
   an output shaft that is installed in the housing and is configured to be driven by the rotational force, the rotational speed of which is reduced by the speed reduction gears;
   a cover that is installed to the housing, wherein the cover forms a space between the cover and the housing to receive the electric motor and the speed reduction gears in the space, and one end part of the output shaft is exposed from the cover to an outside of the cover; and
   an actuator lever that is fixed to the one end part of the output shaft, which is exposed to the outside of the cover, wherein:
   the actuator lever is configured to drive a valve installed in a turbocharger;
   a cylindrical tubular portion, which has an outer diameter reduced through an annular step surface, is formed at the one end part of the output shaft;
   a circular hole, into which the cylindrical tubular portion is inserted, is formed in the actuator lever;
   the housing has an exposing hole, through which another end part of the output shaft is exposed to the outside;
   a rotation stopper configured to engage a jig plate protrusion to limit rotation of the output shaft is formed at the another end part of the output shaft; and
   the engaging wall of the output shaft is positioned in the exposing hole.

2. The electric actuator according to claim 1, wherein the rotation stopper is a groove that is linear and extends across a central axis of the output shaft.

3. The electric actuator according to claim 1, wherein a plurality of positioning recesses is formed in the housing.

4. The electric actuator according to claim 1, wherein the output shaft and the actuator lever are fixed together by a swaging technique, which plastically deforms the one end part of the output shaft, or a welding technique.

5. A manufacturing method of the electric actuator of claim 1, wherein the electric actuator is manufactured through use of a jig, which supports the housing and has the jig plate protrusion, which is engageable with the rotation stopper, the manufacturing method comprising:
   installing the housing to a predetermined location of the jig;
   assembling the electric motor, the speed reduction gears and the output shaft into an inside of the opening portion;
   engaging the rotation stopper to the jig plate protrusion of the jig and thereby positioning the output shaft in a rotational direction in the assembling of the electric motor, the speed reduction gears and the output shaft into the inside of the opening portion;
   assembling the cover to the housing;
   fitting the cylindrical tubular portion into the circular hole; and
   determining a fixation angle of the actuator lever relative to the output shaft and fixing the actuator lever to the output shaft.

* * * * *